United States Patent Office 3,414,606
Patented Dec. 3, 1968

3,414,606
PRODUCTION OF ACRYLONITRILE AND METHACRYLONITRILE
Siegfried Winderl, Ludwigshafen (Rhine), Herwig Hoffmann, Frankenthal, Pfalz, Christof Palm, Mannheim, Heinz Nohe, Ludwigshafen (Rhine), Karl Baer, Weinheim, Bergstrasse, and Hartwig Harders, Ludwigshafen (Rhine), Germany, assignors to Badische Anilin- & Soda-Fabrik Aktiengesellschaft, Ludwigshafen (Rhine), Germany
No Drawing. Filed Apr. 1, 1966, Ser. No. 539,320
Claims priority, application Germany, Apr. 10, 1965, B 81,388
9 Claims. (Cl. 260—465.3)

ABSTRACT OF THE DISCLOSURE

Production of acrylonitrile or methacrylonitrile by reacting propylene or isobutylene, ammonia and oxygen in the vapor phase in the presence of a catalyst consisting substantially of a mixture of metal oxides, an analysis of said mixture showing the presence of (A) 0.1 to 20% by weight of arsenic pentoxide, (B) 1 to 50% by weight of tungstic oxide, and (C) 1 to 50% by weight of molybdenum trioxide, the three components (A), (B) and (C) constituting at least 45% by weight of the active components of the catalyst which also contains (D) 0.1 to 10% by weight, calculated as oxides, of at least one of the metals lead, alkali metals and metals of atomic numbers 22 to 30 inclusive the total content of the components of group (D) in the catalyst not exceeding 55% by weight of the active components and possibly (E) up to 40% by weight silver calculated as silver oxide and the total amount of the components of groups (D) and (E) in the catalyst being up to 55% by weight of the active components.

---

This invention relates to the production of acrylonitrile and methacrylonitrile from propylene and isobutylene by oxidation with oxygen in the presence of ammonia. More specifically, the invention relates to the use of a new catalyst in the said reaction.

The production of $\alpha,\beta$-unsaturated nitriles from $\alpha,\beta$-unsaturated alkenes by oxidation with oxygen in the vapor phase in the presence of ammonia in contact with various catalysts is known. The prior art catalysts contain mainly phosphates, molybdates and tungstates in complex form with certain additives, so that salts of heteropoly acids are usually assumed to be the active constituents. Bismuth, tin and antimony salts of molybdic acid, phosphomolybdic acid and phosphotungstic acid are given as examples of such catalysts in British patent specification No. 867,438. British patent specification No. 709,337 describes as suitable catatlysts quite generally metals, oxides or other compounds of copper, chronmium, vanadium, manganese, iron, nickel, cobalt, molybdenum, silver, zinc, cadmium, tin, tungsten, rhenium, lead, platinum, gold, aluminum, palladium, rhodium, bismuth and uranium, and also all catalysts which are known for the oxidation of naphthalene to phthalic anhydride and of benzene to maleic anhydride.

From this long list however only a few can in fact be regarded as effective, i.e., only a few will give acrylonitrile or methacrylonitrile in about 5% by volume in the gas mixture when the gases are passed over the catalysts under favorable conditions. With all the prior art catalysts, polymeric products are formed in considerable quantities by secondary reactions, and these lead to resinification and stoppages in the apparatus. Such resinification and stoppages in industrial apparatus necessitate repeated interruptions in operation, and involves a great deal of work. In addition, the catalysts of the prior art produce considerable amounts of hydrogen cyanide as a by-product. According to Belgian patent specification No. 657,523 arsenic-containing catalysts can be used for the production of acrylonitrile or methacrylonitrile. Owing to their high content of arsenic, however, these catalysts are highly volatile and therefore have only a short life.

It is an object of the present invention to provide a process for the catalytic production of acrylonitrile from propylene, oxygen and ammonia or of methacrylonitrile from isobutylene, oxygen and ammonia, wherein less resinous by-products and/or less hydrogen cyanide are formed as by-products than in the conventional method, while acrylonitrile or methacrylonitrile is obtained in high yields. It is another object of the invention to provide a new catalyst having a long life, for the production of acrylonitrile from propylene, ammonia and oxygen or of methacrylonitrile from isobutylene, ammonia and oxygen in a one-stage reaction.

We have found that acrylonitrile or methacrylonitrile can be obtained from propylene or isobutylene, respectively, in high yields by oxidation with oxygen or gases containing free oxygen in the presence of ammonia at elevated temperature and in the presence of arsenic-containing catalysts without formation of appreciable amounts of hydrogen cyanide and/or resinous by-products, and that the catalysts have a long life when using as the catalyst a mixture of oxides the analysis of which is 0.1 to 20% by weight of arsenic pentoxide,
1 to 50% by weight of tungstic oxide,
1 to 50% by weight of molybdenum trioxide, these three components constituting at least 45% by weight of the active components of the catalyst, which also contains lead and/or one or more alkali metals and/or one or more metals of atomic numbers 22 to 30 inclusive in combined form, each of these metals, calcuated as oxide, being present in an amount of 0.1 to 10% by weight, and which may also contain up to 40% by weight of silver, calculated as silver oxide, all percentages being with reference to the active components whose total amount is taken as 100%. Active components are taken to mean arsenic, tungsten, molybdenum, lead, alkali metals, metals of atomic numbers 22 to 30 inclusive of the Periodic Chart of the Elements, and/or silver.

The use of one or more members of the said group of metal oxides in catalysts for ammonia oxidation of olefins is known, but not the use of the entire combination described above. Catalysts containing silver are distinguished by the fact that particularly small amounts of hydrocyanic acid are formed in their presence. Preferred catalysts contain, according to analysis, 5 to 16% by weight of arsenic pentoxide, 10 to 40% by weight of tungstic oxide and 15 to 40% by weight of molybdenum, and total additions including silver amount to up to 55% by weight, the preferred amount of additions being 10 to 50% by weight. If silver oxide is used in the catalyst, 10 to 35% by weight is regarded as particularly favorable. The percentages refer to the amount of active components, i.e. any carrier that may be used is not taken into consideration. Moreover, they constitute figures determined by analysis, irrespective of the form in which the various components are present in the catalyst.

It is immaterial in what oxidic form the catalysts are used. Salts, especially silver salts, of molybdoarsenic acid or tungstoarsenic acid or mixtures of these two heteropoly acids, modified with alkali metals, iron, nickel, cobalt, chromium, vanadium, manganese, zinc and lead, may for example be used. It is of course possible to use, in addition to these complex salts, an excess of one or the other of the components contained in the complex salt, e.g.

silver molybdate, silver arsenate, silver tungstate or silver oxide, arsenic pentoxide, molybdenum trioxide, or tungstic oxide alone, so that mixtures of silver salts of tungsto-arsenic acid or molybdoarsenic acid, modified with alkali metals, iron, nickel, cobalt, chromium, vanadium, manganese, zinc and lead, and other components are obtained.

The catalyst is preferably used on carriers, particularly on silica gel, preferably on silica gel having a bulk density of 0.3 to 2.0 g./cm.$^3$. The proportion of the carrier may be varied within wide limits, e.g. in the range of 30 to 80% by weight, preferably about 40 to 60% by weight.

The preparation of the catalyst is effected by conventional methods, e.g. by impregnation with suitable salt solutions followed by drying; by coprecipitation of silica gel and oxides; by kneading silica gel with oxides or salt solutions followed by drying; or by application in molten form, e.g. in a fluidized bed. For the preparation of the catalysts by impregnation, kneading or coprecipitation, solutions or suspensions of, for example, arsenic acid, ammonium arsenate, tungstic acid, ammonium tungstate, molybdenum trioxide, ammonium molybdate, silver nitrate, titanium dioxide, titanium sulfate, vanadium pentoxide, ammonium vanadate, vanadyl oxalate, chromic acid, chrominum (III) nitrate, manganous nitrate, manganese oxalate, manganese carbonate, ferric nitrate, cobaltous nitrate, cobaltous formate, cobaltous acetate, cobaltous carbonate, copper nitrate, copper (II) oxide, copper (I) oxide, zinc nitrate, zinc acetate, zinc formate, lithium molybdate, sodium molybdate, sodium tungstate, potassium molybdate, potassium tungstate, rubidium tungstate, cesium tungstate, lead nitrate, lead (II) oxide, lead carbonate or, in general terms, those salts which are converted into oxides when thermally treated.

It is also possible to dissolve the components in concentrated sulfuric acid, to apply the solution to the carrier and to convert the sulfates into oxides by subsequent thermal treatment. The metal oxides or salts may also be applied to the carrier in conventional manner in a melt of urea or oxalic acid.

Depending on the particle size required, size reduction is carried out by spraying, extruding or grinding. In the case of fluidized-bed processes a particle size of 0.05 to 0.4 mm. is usually preferred, whereas particle sizes of 1 to 5 mm. are advantageous for fixed-bed catalysts.

Conventional oxidation conditions are suitable for the process.

Propylene or isobutylene is used in pure form. Oxygen may also be used in pure form, but air is generally used. Ammonia is also used pure. Inert gases, such as nitrogen or carbon monoxide or carbon dioxide, and also hydrocarbons, such as methane, ethane, propane, or other saturated gaseous hydrocarbons which are inert under the conditions are not injurious. To control the heat balance of the reaction steam is frequently added as inert gas. The ammonia may be previously mixed with the hydrocarbon, the oxygen and any other gases, but the ammonia may also be first mixed with the other reactants and the inert gases in the reactor. This method is suitable when a fluidized catalyst is used.

The ratio of olefin to oxygen and ammonia may be seen from the equation:

in which R may denote the radical $CH_2=CH-$ or the radical

Oxygen and ammonia may be used in excess. Molar ratios of propylene (or isobutylene) to oxygen of 1:0.5 to 1:3, preferably 1:0.7 to 1:1.8, and molar ratios of propylene (or isobutylene) to ammonia of 1:0.05 to 1:5, preferably 1:0.5 to 1:2, are used. Oxygen-containing by-products are formed to an increased extent at ratios of ammonia to propylene or isobutylene which deviate appreciably from the molar ratio 1:1.

Since the process is usually carried out in the presence of inert gases, it is advantageous to use air as the source of oxygen. If steam is added as an additional inert gas, an amount of 0.25 to 10 moles per mole of propylene (or isobutylene) is advantageous. It is preferred to use gas mixtures containing from 1 to about 15% by volume, particularly from 4 to 8% by volume, of propylene or isobutylene. The gas leaving the catalyst may be recycled after the acrylonitrile (or methacrylonitrile) has been separated. In this case it is advantageous to use ammonia in excess as the inert gas instead of nitrogen and to meter in pure oxygen. The reaction is carried out at from 400° to 580° C., advantageously from 450° to 530° C.

The residence time of the gas in contact with the catalyst may be varied; it is preferably about 0.5 to 3.5 seconds, particularly 1.5 to 2.5 seconds. The residence time is defined as the quotient of the volume of catalyst in the quiescent state and the gas volume under operating conditions.

The catalyst may be stationary, but it is preferred to keep it in fluidization.

The process is usually carried out at atmospheric pressure, but it may be carried out also at a pressure slightly below atmospheric, for example at 400 mm. Hg, or at a pressure slightly above atmospheric, for example 2 atmospheres gauge.

The reaction is carried out in a conventional way by passing the gas mixture (which may be prepared by mixing in a mixing vessel or, when steam is entrained, simply by passage through water at a temperature corresponding to the desired partial vapor pressure) at the reaction temperature over the catalyst heated to the reaction temperature, cooling the reaction gas so that the added water is condensed out and then carrying out the separation of the nitrile by a conventional method, for example by washing with water or an organic solvent. Besides the advantage that less resinous products are formed when using the new catalyst, the new catalyst has the advantage of producing only small amounts of hydrocyanic acid as a by-product.

The invention will be further illustrated in the examples, Examples A and B illustrating the preparation of suitable catalysts and Examples 1 to 12 illustrating their use in the production of the nitriles.

Example A 125 g. of arsenic pentoxide, 250 g. of tungstic oxide, 375 g. of molybdenum trioxide and 40 g. of chromic oxide are made into a paste with 500 ml. of water and combined with a solution of 49 g. of cobalt (II) nitrate, 137 g. of crystalline zinc nitrate, 440 g. of silver nitrate, and 86 g. of crystalline lead nitrate in 580 ml. of water. This mixture of metal oxides and metal salts is allowed to flow into 1486 g. of silica gel in a kneader. After thorough mixing and drying the catalyst is annealed at 450° C., the metal nitrates being converted into the corresponding oxides. The catalyst has the following composition: 5.0% $As_2O_5$, 10% $WO_3$, 15% $MoO_3$, 1.6% $Cr_2O_3$, 12% $Ag_2O$, 0.8% CoO, 1.5% ZnO, 2.5% PbO, 51.6% $SiO_2$. Similar catalysts are obtained by an analogous method using different relative proportions.

Example B 1414 g. of arsenic pentoxide, 2670 g. of tungstic oxide, 3990 g. of molybdenum trioxide and 526 g. of chromic oxide are made into a paste with 10 l. of water and thoroughly mixed with a solution of 490 g. of cobalt (II) nitrate, 4400 g. of silver nitrate, 1370 g. of crystalline zinc nitrate and 866 g. of crystalline lead nitrate in 3 l. of water and with 12,810 g. of silica gel in a kneader. The catalyst is sprayed into a spraying tower and dried and is then annealed at 450° C. for six hours. It has the following composition: 5.0% $As_2O_5$, 10% $WO_3$, 15%

$MoO_3$, 1.6% $Cr_2O_3$, 12% $Ag_2O$, 0.8% CoO, 1.5% ZnO, 2.5% PbO, 51.6% $SiO_2$.

Example 1

500 ml. of the finished, annealed catalyst having the following composition: 5.0% $As_2O_5$, 10% $WO_3$, 15% $MoO_3$, 1.6% $Cr_2O_3$, 12% $Ag_2O$, 0.8% CoO, 1.5% ZnO, 2.5% PbO, 51.6% $SiO_2$, prepared according to Example A and having a particle size of 0.06 to 0.3 mm., is heated to a reaction temperature of 460° C. in a vertical reaction tube 60 mm. in diameter and provided at the bottom with a gas-permeable frit. A mixture of 12 l. of propylene, 12 l. of ammonia, 90 l. of air and 50 l. of steam per hour is passed from below through the catalyst. The gas mixture keeps the catalyst in fluidized motion. The residence time is 4.4 seconds.

The gas mixture has the following composition:

| | Vol. percent |
|---|---|
| Propylene | 7.3 |
| Ammonia | 7.3 |
| Oxygen | 11.5 |
| Nitrogen | 43.4 |
| Steam | 30.5 |

The gas leaving the reaction tube is passed through a cooler for condensation of the steam. Determination of the acrylonitrile content is effected in the reaction gas itself by infrared spectroscopy and gas chromatography.

About 6% of acetonitrile (on the acryonitrile content) is obtained as a by-product. When using this catalyst the content of acrolein and that of hydrocyanic acid are so low that they cannot be detected analytically (less than 50 p.p.m. and less than 0.01%, respectively).

The yield of acrylonitrile is 78% of the theory, with reference to the propylene reacted.

Examples 2 to 8

The results given in the table below are achieved under the conditions indicated in Example 1.

| Ex. | Catalyst prepared according to method of Example— | Composition of catalyst | Residence time, sec. | Reaction temperature, °C. | Yield percent of the theory on propylene reacted |
|---|---|---|---|---|---|
| 2 | A | 7% $As_2O_5$, 10% $Ag_2O$, 8% $WO_3$, 12% $MoO_3$, 0.6% CoO, 1.5% $Cr_2O_3$, 1.8% ZnO, 3% PbO, 56.1% $SiO_2$. | 4.4 | 460 | 80 |
| 3 | A | 3% $As_2O_5$, 14% $Ag_2O$, 8% $WO_3$, 12% $MoO_3$, 1% CoO, 1.5% $Cr_2O_3$, 1.2% ZnO, 3% PbO, 56.3% $SiO_2$. | 4.4 | 460 | 71 |
| 4 | A | 3% $As_2O_5$, 10% $Ag_2O$, 12% $WO_3$, 18% $MoO_3$, 0.6% CoO, 1.5% $Cr_2O_3$, 1.2% ZnO, 3% PbO, 50.7% $SiO_2$. | 4.4 | 460 | 80 |
| 5 | A | 7% $As_2O_5$, 10% $Ag_2O$, 12% $WO_3$, 12% $MoO_3$, 1% CoO, 1.5% $Cr_2O_3$, 1.2% ZnO, 2% PbO, 53.3% $SiO_2$. | 4.6 | 430 | 84 |
| 6 | A | 3% $As_2O_5$, 14% $Ag_2O$, 12% $WO_3$, 12% $MoO_3$, 0.6% CoO, 1.5% $Cr_2O_3$, 1.8% ZnO, 2% PbO, 53.1% $SiO_2$. | 4.4 | 460 | 73 |
| 7 | A | 7% $As_2O_5$, 14% $Ag_2O$, 12% $WO_3$, 18% $MoO_3$, 1% CoO, 1.5% $Cr_2O_3$, 1.8% ZnO, 3% PbO, 41.7% $SiO_2$. | 4.4 | 460 | 76 |
| 8 | A | 5% $As_2O_5$, 6% $Ag_2O$, 15% $WO_3$, 15% $MoO_3$, 2% $Fe_2O_3$, 2% $MnO_2$, 2% ZnO, 53% $SiO_2$. | 4.1 | 504 | 72 |

In all cases the content of hydrocyanic acid and that of acrolein are so low that they cannot be detected analytically.

Example 9

The reaction is carried out in the presence of the catalyst used in Example 7 and 100 l. of steam per hour is introduced as described in Example 1. The residence time is now 3.4 seconds.

The gas mixture has the following composition:

| | Vol. percent |
|---|---|
| Propylene | 5.6 |
| Ammonia | 5.6 |
| Oxygen | 8.8 |
| Nitrogen | 33.2 |
| Steam | 46.7 |

As in Example 7, the yield is 76% of the theory with reference to the amount of propylene reacted. Hydrocyanic acid and acrolein cannot be detected analytically.

Example 10

500 ml. of the catalyst prepared according to the method described in Example B and having the following composition: 5.0% $As_2O_5$, 10% $WO_3$, 15% $MoO_3$, 1.6% $Cr_2O_3$, 12% $Ag_2O$, 0.8% CoO, 1.5% ZnO, 2.5% PbO, 51.6% $SiO_2$, is placed in the reaction vessel described in Example 1 and the reaction is carried out analogously in Example 1. The reaction temperature is 470° C. The gas mixture to be reacted has the following composition:

| | Vol. percent |
|---|---|
| Propylene | 7.3 |
| Ammonia | 7.3 |
| Oxygen | 11.5 |
| Nitrogen | 43.4 |
| Steam | 30.5 |

The residence time is 4.3 seconds. The yield of acrylonitrile is 76% of the theory, with reference to the amount of propylene reacted.

The content of hydrocyanic acid and that of acrolein cannot be detected analytically.

Example 11

750 ml. of a catalyst prepared according to the method described in Example A and having the following composition: 4.8% $As_2O_5$, 10.5% $Ag_2O$, 13% $WO_3$, 12.6% $MoO_3$, 0.79% CoO, 1.8% ZnO, 1.5% $Cr_2O_5$, 2.7% PbO, 52.71% $SiO_2$, is placed in the reaction vessel described in Example 1 and the reaction is carried out analogously to Example 1. The reaction temperature is 467° C. The residence time is 6.5 seconds. The yield of acrylonitrile is 79% of the theory, with reference to the amount of propylene reacted.

The content of hydrocyanic acid and that of acrolein cannot be detected analytically.

For comparison, catalyst Nos. 3 and 10 of Belgian patent specification No. 617,523 were prepared and used for acrylonitrile synthesis under the following conditions:

| | Catalyst No. 10 | Catalyst No. 3 |
|---|---|---|
| Propylene, percent | 6.9 | 6.3 |
| Ammonia, percent | 6.9 | 6.3 |
| Air, percent | 57.5 | 56.3 |
| Water, percent | 28.7 | 31.1 |
| Temperature, °C | 400 | 430 |
| Residence time, sec | 4.5 | 4.7 |
| Conversion rate (propylene), percent | 55 | 50 |
| Conversion (acrylonitrile), percent | 22.1 | 35.5 |
| Yield (acrylonitrile), percent | 40.0 | 70.5 |
| Conversion (HCN), percent | 0.15 | 2.8 |

Conversion and yield are defined as follows:

$$\text{Conversion} = \frac{\text{percent by volume of acrylonitrile}}{\text{percent by volume of propylene supplied}}$$

$$\text{Yield} = \frac{\text{Conversion}}{\text{Conversion rate}}$$

Example 12

500 ml. of a catalyst prepared according to the method described in Example A and having the following composition: 5.0% $As_2O_5$, 15% $WO_3$, 15% $MoO_3$, 4% $V_2O_5$, 0.5% $K_2O$, 2% CoO, 3% $Cr_2O_3$, 55.5% $SiO_2$, is placed in the reaction vessel described in Example 1 and the reaction is carried out analogously to Example 1. The reaction temperature is 504° C., the residence period 4.1 seconds. The yield to acrylonitrile is 81% of the theory, with reference to propylene reacted.

The content of hydrocyanic acid and that of acrolein cannot be detected analytically.

We claim:

1. A process for the production of acrylonitrile or methacrylonitrile which comprises reacting propylene or isobutylene, ammonia and oxygen at a temperature of from 400° to 580° C. in the presence of a catalyst consisting essentially of a mixture of metal oxides the analysis of which mixture corresponds to
    (A) 0.1 to 20% by weight of arsenic pentoxide
    (B) 1 to 50% by weight of tungstic oxide and
    (C) 1 to 50% by weight of molybdenum trioxide, the three components (A), (B) and (C) constituting at least 45% by weight of the active components of the catalyst which also contains
    (D) an oxide of at least one oxide of the metals lead, alkali metals and metals of atomic numbers 22 to 30 inclusive in combined form, each of the metal oxides of this group (D) being present in an amount of 0.1 to 10% by weight and
    (E) 6 to 40% by weight of silver oxide, the total amount of the components of groups (D) and (E) in the catalyst being up to 55% by weight of the active components.

2. A process as claimed in claim 1 in which the analysis of the catalyst corresponds to 5 to 16% by weight of arsenic pentoxide, 10 to 40% by weight of tungstic trioxide and 15 to 40% by weight of molybdenum trioxide, the total amount of the metal oxide of groups (D) and (E) being 10 to 50% by weight.

3. A process as claimed in claim 1 in which the analysis of the catalyst corresponds to 5 to 16% by weight of arsenic pentoxide, 10 to 40% by weight of tungstic trioxide and 15 to 40% by weight of molybdenum trioxide and the total amount of the metal oxide of groups (D) and (E) being 10 to 50% by weight, the content of silver oxide being 10 to 35% by weight.

4. A process as claimed in claim 1 in which said catalyst is supported on about 30 to 80% by weight of an inert carrier.

5. A process as claimed in claim 4 in which the said carrier consists substantially of silica.

6. A process as claimed in claim 1 in which the molar ratio of ammonia to propylene or isobutylene is about 0.05 to 1 to 5:1.

7. A process as claimed in claim 1 in which the molar ratio of ammonia to propylene or isobutylene is about 0.5:1 to 2:1.

8. A process as claimed in claim 1 in which the molar ratio of oxygen to propylene or isobutylene is 0.5:1 to 3:1.

9. A process as claimed in claim 6 in which the reaction is carried out in a fluidized bed of the catalyst.

References Cited

UNITED STATES PATENTS

| 3,179,694 | 4/1965 | Van Eygen et al. | 260—465.9 |
| 3,200,141 | 8/1965 | Milberger | 260—465.3 |

FOREIGN PATENTS

| 929,650 | 6/1963 | Great Britain. |
| 999,629 | 7/1965 | Great Britain. |

JOSEPH P. BRUST, *Primary Examiner.*